United States Patent
Horng et al.

(10) Patent No.: US 8,207,643 B2
(45) Date of Patent: Jun. 26, 2012

(54) MOTOR INCLUDING A STATOR BOBBIN HAVING A BEARING ABUTTING MEMBER

(75) Inventors: Alex Horng, Kaohsiung (TW); Chi Min Wang, Kaohsiung (TW)

(73) Assignee: Sununwealth Electric Machine Industry Co., Ltd., Kaohsiung (TW)

( * ) Notice: Subject to any disclaimer, the term of this patent is extended or adjusted under 35 U.S.C. 154(b) by 58 days.

(21) Appl. No.: 12/944,112

(22) Filed: Nov. 11, 2010

(65) Prior Publication Data
US 2011/0057538 A1    Mar. 10, 2011

Related U.S. Application Data (63) Continuation-in-part of application No. 12/173,909, filed on Jul. 16, 2008, now abandoned.

(51) Int. Cl.
*H02K 5/24* (2006.01)
(52) U.S. Cl. .......... 310/90; 310/67 R; 360/99.08; 384/107; 417/423.12
(58) Field of Classification Search .......... None
See application file for complete search history.

(56) References Cited

U.S. PATENT DOCUMENTS

| | | | |
|---|---|---|---|
| 5,610,462 A | 3/1997 | Takahashi | 310/90 |
| 6,376,946 B1 | 4/2002 | Lee | 310/67 R |
| 6,954,017 B2 * | 10/2005 | Takahashi et al. | 310/85 |
| 7,140,777 B2 | 11/2006 | Shih et al. | 384/100 |
| 7,342,336 B1 | 3/2008 | Horng et al. | 310/90 |
| 7,420,304 B2 * | 9/2008 | Sugiyama et al. | 310/90 |
| 7,498,704 B2 | 3/2009 | Otsuki et al. | 310/90.5 |
| 7,518,272 B2 | 4/2009 | Yeh et al. | 310/67 R |
| 7,649,291 B2 | 1/2010 | Horng et al. | 310/90 |
| 7,659,649 B2 * | 2/2010 | Lin et al. | 310/90.5 |
| 7,712,963 B2 * | 5/2010 | Lin et al. | 384/100 |
| 7,786,639 B2 * | 8/2010 | Horng | 310/91 |
| 8,047,717 B2 * | 11/2011 | Horng et al. | 384/107 |
| 2004/0227422 A1 | 11/2004 | Chang et al. | 310/91 |
| 2006/0108883 A1 | 5/2006 | Yet et al. | 310/85 |
| 2007/0188034 A1 * | 8/2007 | Yoshida | 310/90 |
| 2007/0217720 A1 | 9/2007 | Lin et al. | 384/100 |
| 2007/0231163 A1 | 10/2007 | Liu | 417/354 |
| 2007/0284957 A1 | 12/2007 | Horng et al. | 310/90 |
| 2008/0056627 A1 | 3/2008 | Horng et al. | 384/100 |

(Continued)

FOREIGN PATENT DOCUMENTS
CN    2753040    1/2006

*Primary Examiner* — Karl Tamai
(74) *Attorney, Agent, or Firm* — Alan Kamrath; Kamrath IP Lawfirm, PA (57) ABSTRACT

A motor includes a housing, a rotor and a stator. The housing includes a shaft tube having a free end. The rotor includes a shaft rotatably extending through the bearing and having an annular groove. The stator includes an assembling hole receiving the shaft tube. The stator includes an upper bobbin, a lower bobbin, a plurality of silicon steel plates and a winding. The upper bobbin includes a plurality of pressing plates annularly, each having first and second abutting portions. The first abutting portion has a first end connecting to the upper bobbin, and a second end abutting against a top surface of the bearing. The free end is lower than the first end but higher than the second end. The first abutting portion is spaced from the shaft tube and abuts only on the bearing. The second abutting portion extends from the first abutting portion into the annular groove.

10 Claims, 13 Drawing Sheets

U.S. PATENT DOCUMENTS

| | | | |
|---|---|---|---|
| 2008/0056630 A1 | 3/2008 | Horng et al. | 384/276 |
| 2008/0157633 A1 | 7/2008 | Yang et al. | 310/67 |
| 2008/0169733 A1 | 7/2008 | Lin et al. | 310/67 R |
| 2009/0290998 A1* | 11/2009 | Tabata et al. | 417/354 |
| 2009/0309437 A1* | 12/2009 | Horng et al. | 310/90 |
| 2009/0309438 A1* | 12/2009 | Horng et al. | 310/90 |
| 2010/0109460 A1 | 5/2010 | Horng | 310/90 |
| 2010/0127588 A1 | 5/2010 | Horng | 310/90 |
| 2010/0272586 A1* | 10/2010 | Hsu et al. | 417/354 |
| 2010/0329901 A1* | 12/2010 | Horng | 417/354 |
| 2011/0057538 A1* | 3/2011 | Horng et al. | 310/216.113 |

* cited by examiner

MOTOR INCLUDING A STATOR BOBBIN HAVING A BEARING ABUTTING MEMBER

This is a continuation-in-part application of U.S. patent application Ser. No. 12/173,909 filed on Jul. 16, 2008 now abandoned.

BACKGROUND OF THE INVENTION

1. Field of the Invention

The present invention generally relates to a motor and, more particularly, to a motor including a stator bobbin having a bearing abutting member that avoids a bearing and a rotor from disengaging from a shaft tube thereof.

2. Description of the Related Art

Figure 1:
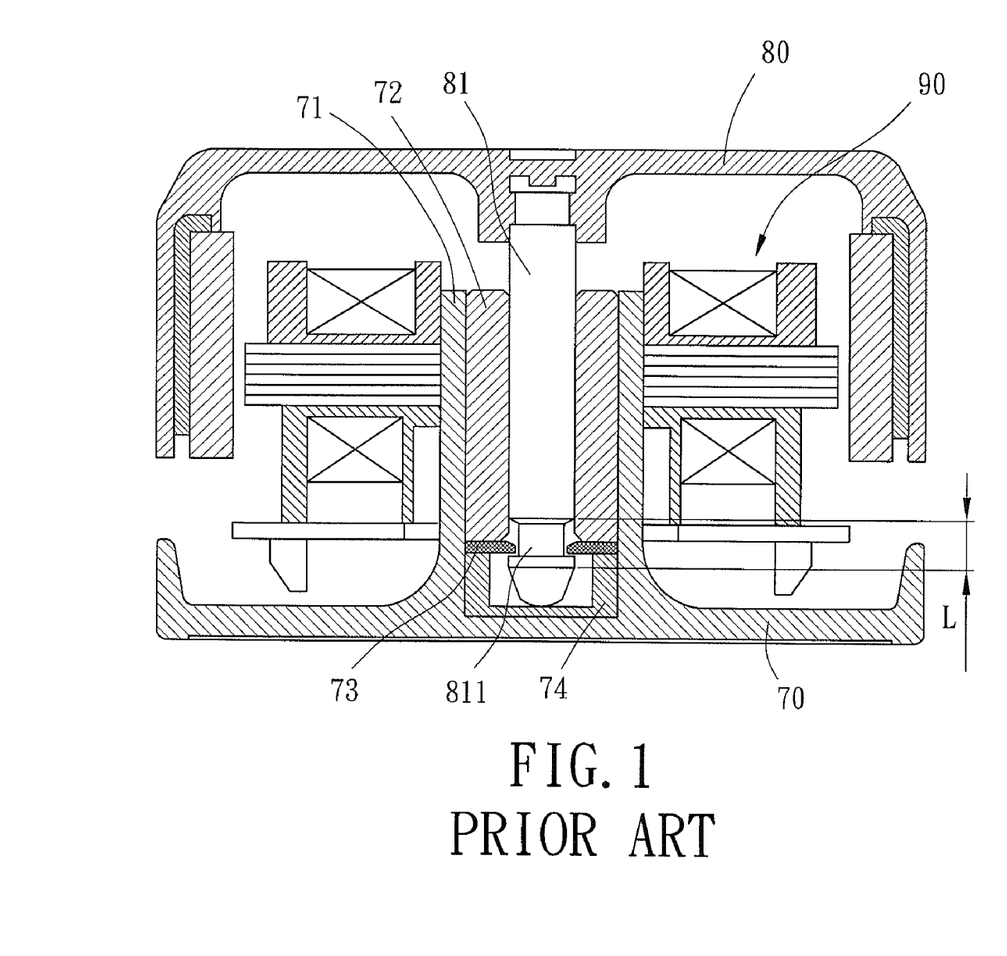
FIG. 1 is a cross sectional view illustrating a conventional motor.

A conventional motor is shown in FIG. 1, and includes a housing 70, a rotor 80 and a stator 90. The housing 70 includes a hollow shaft tube 71 having a sealed bottom. A bearing 72, a retaining plate 73 and an oil end cap 74 are received in the shaft tube 71. The center of the rotor 80 includes a shaft 81 rotatably extending through the bearing 72. An annular groove 811 is formed on the shaft 81 and is close to the free end of the shaft 81. The inner edge of the retaining plate 73 extends into the annular groove 811. The stator 90 is mounted around the shaft tube 71 to drive the rotor 80 to rotate.

In general, for the conventional motor, the retaining plate 73 is partially received in the annular groove 811. Thus, the retaining plate 73 can prevent the rotor 80 and housing 70 from separating when the rotor 80 rotates, with said separation happening when the shaft 81 moves in a direction parallel to a longitudinal axis of the shaft tube 71. A part of the shaft 81 forming the annular groove 811 to receive the retaining plate 73 is defined as having a length "L" in a longitudinal direction, and the outer periphery of the shaft 81 in said part does not come into contact with the inner periphery of the bearing 72 when the rotor 80 rotates normally. Therefore, because of the length "L" of the part, the shaft 81 does not come into contact with the bearing 72. Thus, the contact area between the shaft 81 and the bearing 72 is reduced, causing low rotating stability of the rotor 81. Especially, for a micromotor under the condition of limited contact area between the shaft 81 and the bearing 72, the low rotating stability of the rotor 81 is induced more easily.

Furthermore, in order to prevent the rotor 80 and housing 70 of the conventional motor from separating, the retaining plate 73 must be partially received in the annular groove 811. Therefore, in assembly, the combinations between the shaft 81 of the rotor 80, the bearing 72, the retaining plate 73 and other related components are completed in the shaft tube 71. Thus, it's difficult to check whether all the mentioned components are truly and stably coupled in the shaft tube 71. Consequently, assembling quality of the conventional motor is uncontrollable and operation for assembling said motor is inconvenient.

SUMMARY OF THE INVENTION

The primary objective of this invention is to provide a motor including a stator bobbin having an abutting member to avoid a rotor and a bearing from disengaging from a shaft tube. Accordingly, rotating stability and assembling convenience of the motor are enhanced.

The secondary objective of this invention is to provide the motor having the abutting member formed on an upper bobbin of the stator. Accordingly, structure of the motor is simplified.

The third objective of this invention is to provide the motor further including a cover plate covering the bearing and abutted by the abutting member to avoid the rotor and the bearing from disengaging from the shaft tube. Accordingly, positioning of the rotor and the bearing is improved.

The fourth objective of this invention is to provide the motor further including the shaft tube with a positioning section on an outer periphery thereof for positioning the stator. Accordingly, the abutting member is positioned correctly and breakage thereof is avoided.

The invention discloses a motor comprising a housing, a rotor and a stator. The housing includes a shaft tube receiving a bearing and having a free end. The rotor includes a shaft rotatably extending through the bearing and having an annular groove in a neck shape formed on an outer periphery thereof. The stator includes an assembling hole receiving the outer periphery of the shaft tube. The stator further includes an upper bobbin, a lower bobbin, a plurality of silicon steel plates sandwiched between the upper and lower bobbins, and a winding wound around the plurality of silicon steel plates. The upper bobbin includes an abutting member in the form of a plurality of pressing plates annularly formed, in intervals, on an inner periphery of the upper bobbin. Each pressing plate has a first abutting portion and a second abutting portion. The first abutting portion has a first end connecting to the inner periphery of the upper bobbin and a second end abutting against a top surface of the bearing, and extends in a straightforward manner from the first end to the second end. The free end of the shaft tube is lower than the first end but higher than the second end of the first abutting portion in an axial direction. The first abutting portion is spaced from the shaft tube and abuts only on the bearing. The second abutting portion extends from the first abutting portion into the annular groove of the shaft to avoid the bearing and the rotor from disengaging from the shaft tube.

Furthermore, the invention discloses a motor comprising a housing, a rotor and a stator. The housing includes a shaft tube receiving a bearing and having a free end. The rotor includes a shaft rotatably extending through the bearing, and having an annular groove in a neck shape formed on an outer periphery thereof. The stator includes an assembling hole receiving the outer periphery of the shaft tube. The stator further includes an upper bobbin, a lower bobbin, a plurality of silicon steel plates sandwiched between the upper and lower bobbins, and a winding wound around the plurality of silicon steel plates. The upper bobbin includes an abutting member in the form of an annular pressing ring formed on an inner periphery of the upper bobbin and having a center hole receiving the shaft. The annular pressing ring has a first end connecting to the inner periphery of the upper bobbin and a second end abutting against a top surface of the bearing. The annular pressing ring extends in a straightforward manner from the first end to the second end. The free end of the shaft tube is lower than the first end, but higher than the second end of the first abutting portion in an axial direction. The annular pressing ring is spaced from the shaft tube, and abuts only against the bearing and extends into the annular groove of the shaft to avoid the bearing and the rotor from disengaging from the shaft tube.

Furthermore, the invention discloses a motor comprising a housing, a rotor, a cover plate and a stator. The housing includes a shaft tube receiving a bearing, wherein the shaft tube has a free end. The rotor includes a shaft rotatably extending through the bearing and having an annular groove on an outer periphery thereof. The cover plate includes an axial hole receiving the shaft, with an inner edge of the cover plate extending into the annular groove of the shaft. The stator includes an assembling hole receiving the outer periphery of the shaft tube. The stator further includes an upper bobbin, a lower bobbin, a plurality of silicon steel plates sandwiched between the upper and lower bobbins, and a winding wound around the plurality of silicon steel plates. The upper bobbin includes an abutting member formed on an inner periphery thereof The abutting member has a first end connecting to the inner periphery of the upper bobbin and a second end abutting against the cover plate. The abutting member extends in a straightforward manner from the first end to the second end and is spaced from the shaft tube. The free end of the shaft tube is lower than the first end, but higher than the second end of the first abutting portion in an axial direction. The abutting member abuts only against the cover plate to avoid the bearing and the rotor from disengaging from the shaft tube.

Further scope of the applicability of the present invention will become apparent from the detailed description given hereinafter. However, it should be understood that the detailed description and specific examples, while indicating preferred embodiments of the invention, are given by way of illustration only, since various modifications will become apparent from this detailed description to those skilled in the art.

BRIEF DESCRIPTION OF THE DRAWINGS

The present invention will become more fully understood from the detailed description given herein below and the accompanying drawings which are given by way of illustration only, and thus are not limitative of the present invention, and wherein.

In the various figures of the drawings, the same numerals designate the same or similar parts. Furthermore, when the terms "first", "second","upper", "lower" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
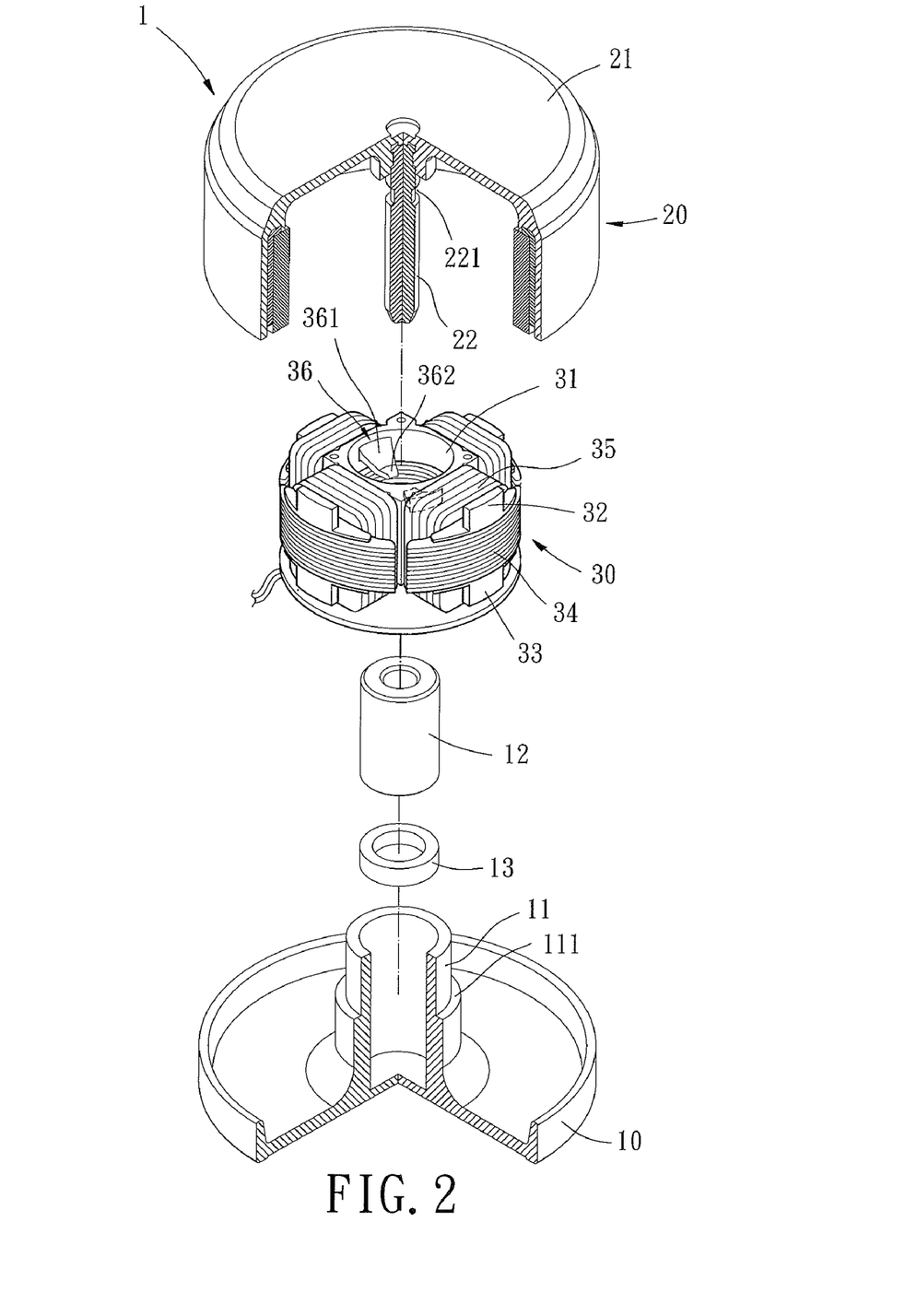
FIG. 2 is an exploded perspective view illustrating a motor in accordance with a first embodiment of the present invention.
Figure 3:
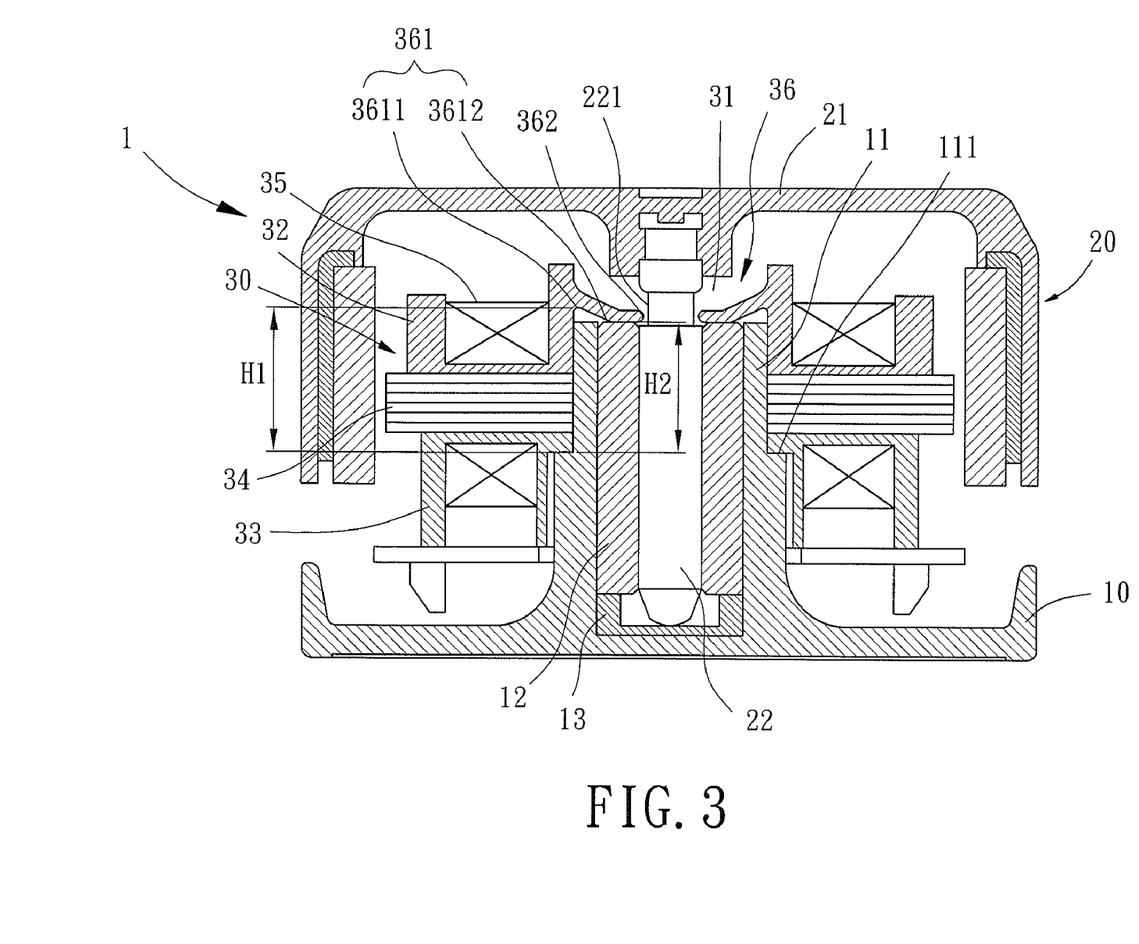
FIG. 3 is a cross sectional view illustrating the motor in accordance with the first embodiment of the present invention.

Referring initially to FIGS. 2 and 3, an exploded perspective view and a cross sectional view of a motor of a first embodiment according to the preferred teachings of the present invention is illustrated. The motor designated 1 includes a housing 10, a rotor 20 and a stator 30. The housing 10 includes a hollow shaft tube 11 having a sealed bottom. The shaft tube 11 receives a bearing 12, a supporting plate 13 and other components. Besides, the shaft tube 11 includes a positioning section 111 on an outer periphery thereof, with the positioning section 111 providing a supporting face opposite the stator 30 when the housing 10 and the stator 30 are assembled. The supporting face is preferably perpendicular to the axis of the shaft tube 11.

The rotor 20 includes a hub 21 and a shaft 22. There may be a plurality of blades (not illustrated) disposed on an outer periphery of the hub 21, so that the rotor 20 can be taken as an impeller of a fan. One end of the shaft 22 is coupled to a center of the hub 21, and the other end thereof rotatably extends through the bearing 12 and abuts the supporting plate 13. Thus, the rotor 20 can rotate relatively to, and is coupled to, the housing 10 through the bearing 12. In addition, an annular groove 221 in a neck shape is formed on an outer periphery of the shaft 22, and away from the free end of the shaft 22 by which the shaft 22 abuts against the supporting plate 13. Therefore, the outer periphery of the shaft 22 close to the free end thereof can thus rotatably come into contact with the bearing 12 to enhance rotating stability of the rotor 20.

The stator 30 includes an assembling hole 31, so as to allow the stator 30 to be mounted around the shaft tube 11. Preferably, the stator 30 is coupled to the outer periphery of the shaft tube 11 by close-fitting, bonding, or other suitable ways to reliably fix the stator 30 on the shaft tube 11. The stator 30 includes an upper bobbin 32, a lower bobbin 33, a plurality of silicon steel plates 34 sandwiched between the upper and lower bobbins 32 and 33, and a winding 35 wound around the silicon steel plates 34.

Figure 4:
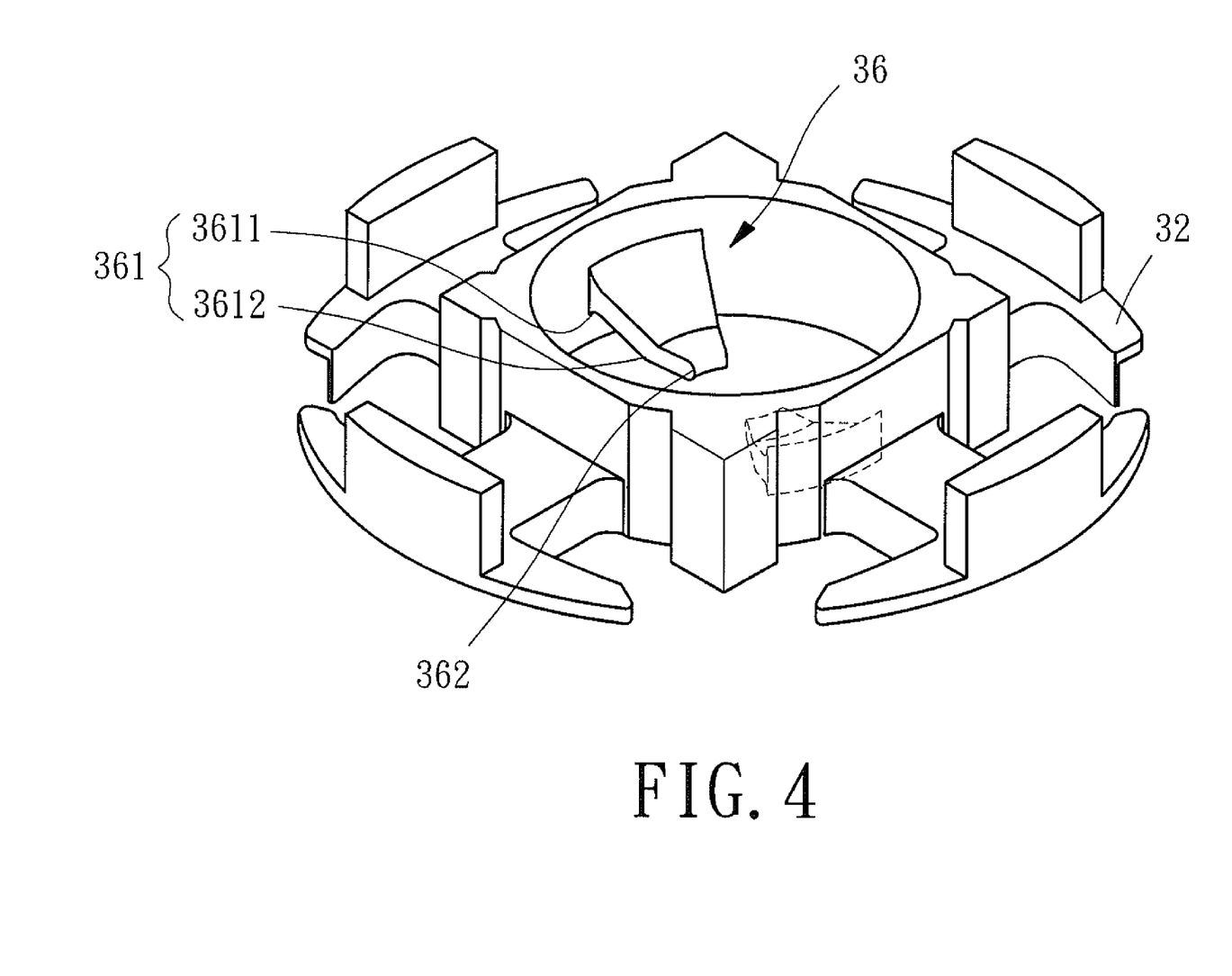
FIG. 4 is a partial, perspective view of an upper bobbin of the motor of FIG. 3.

Referring now to FIG. 4, an abutting member 36 is formed on an inner periphery of the upper bobbin 32. The abutting member 36 abuts against the bearing 12 and extends into the annular groove 221 of the shaft 22, so as to avoid the bearing 12 from disengaging from the shaft tube 11. Furthermore, because the abutting member 36 extends into the annular groove 221 of the shaft 22, the departure of rotor 20 from the shaft tube 11 is avoided effectively by retaining the shaft 22 through the abutting member 36. In the first embodiment of the present invention, the abutting member 36 is in the form of a plurality of pressing plates, and said pressing plates are annularly formed, in intervals, on the inner periphery of the upper bobbin 32. Moreover, each pressing plate has a first abutting portion 361 abutting against the bearing 12 to retain the bearing 12, and a second abutting portion 362 extending from the first abutting portion 361 into the annular groove 221 of the shaft 22 to prevent the rotor 20 from disengaging from the shaft tube 11. The first abutting portion 361 has a first end 3611 connecting to an inner periphery of the upper bobbin 32, as well as a second end 3622 abutting against a top surface of the bearing 12. The first end 3611 has a first height H1 with respect to the supporting face of the positioning section 111, and the second end 3622 has a second height H2 with respect to the supporting face of the positioning section 111. The first height H1 is greater than the second height H2. The first abutting portion 361 extends in a straightforward manner from the first end 3611 to the second end 3622. Besides, the first abutting portion 361 is spaced from the shaft tube 11 and abuts only on the bearing 12.

Figure 5:
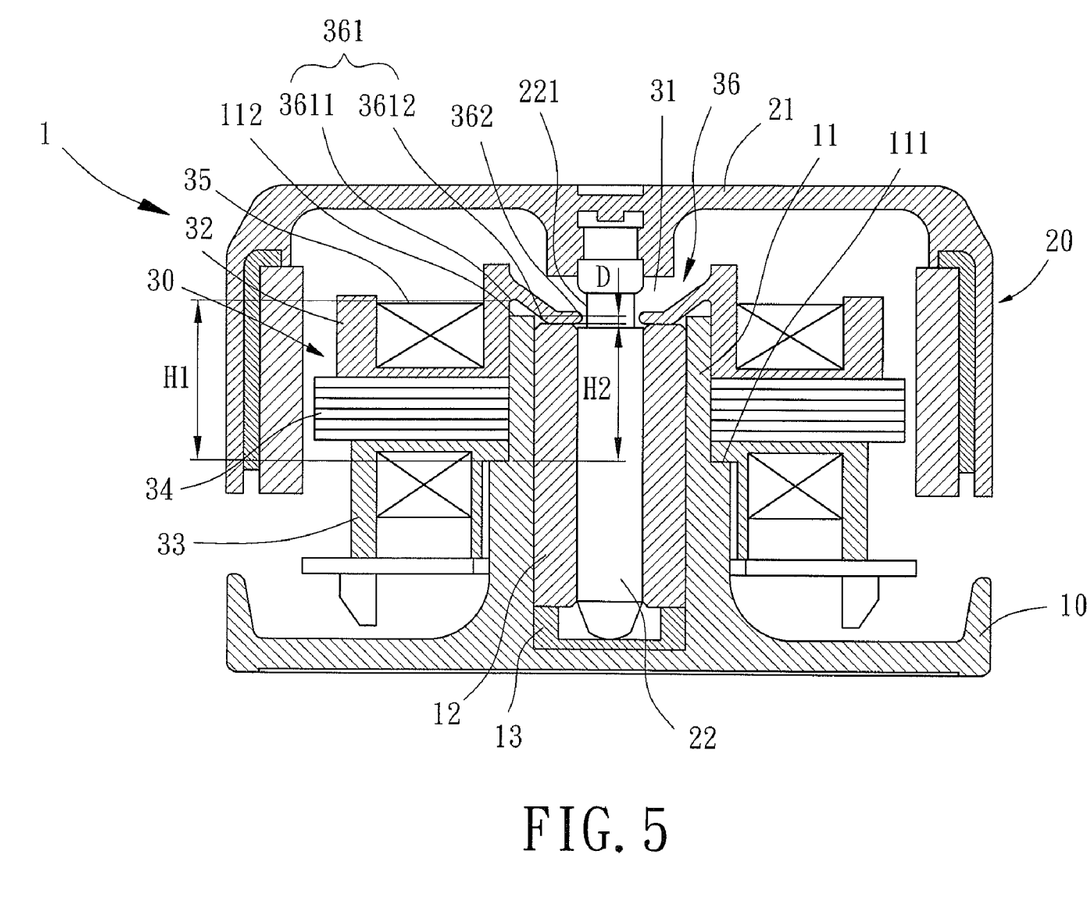
FIG. 5 is a cross sectional view illustrating a motor modified from the motor of the first embodiment of the present invention.
Figure 6:
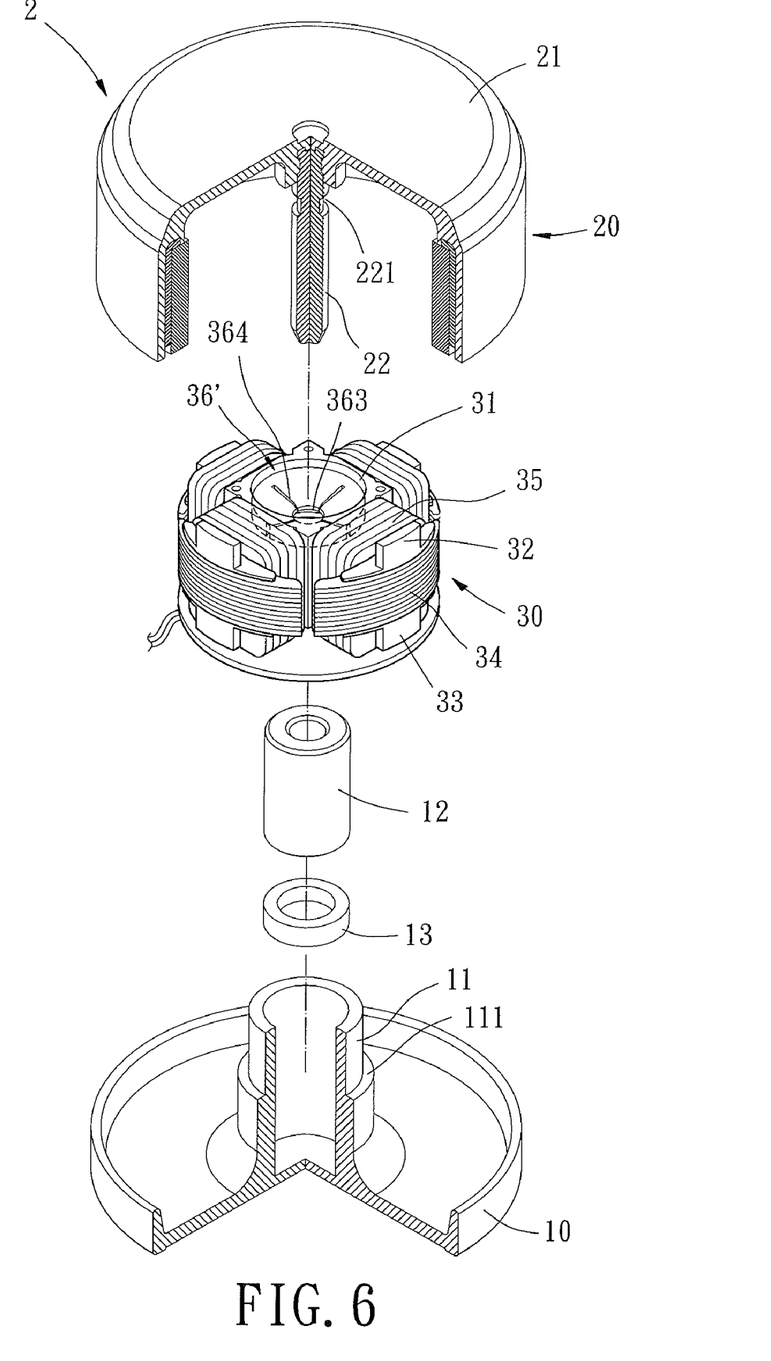
FIG. 6 is an exploded perspective view illustrating a motor in accordance with a second embodiment of the present invention.
Figure 7:
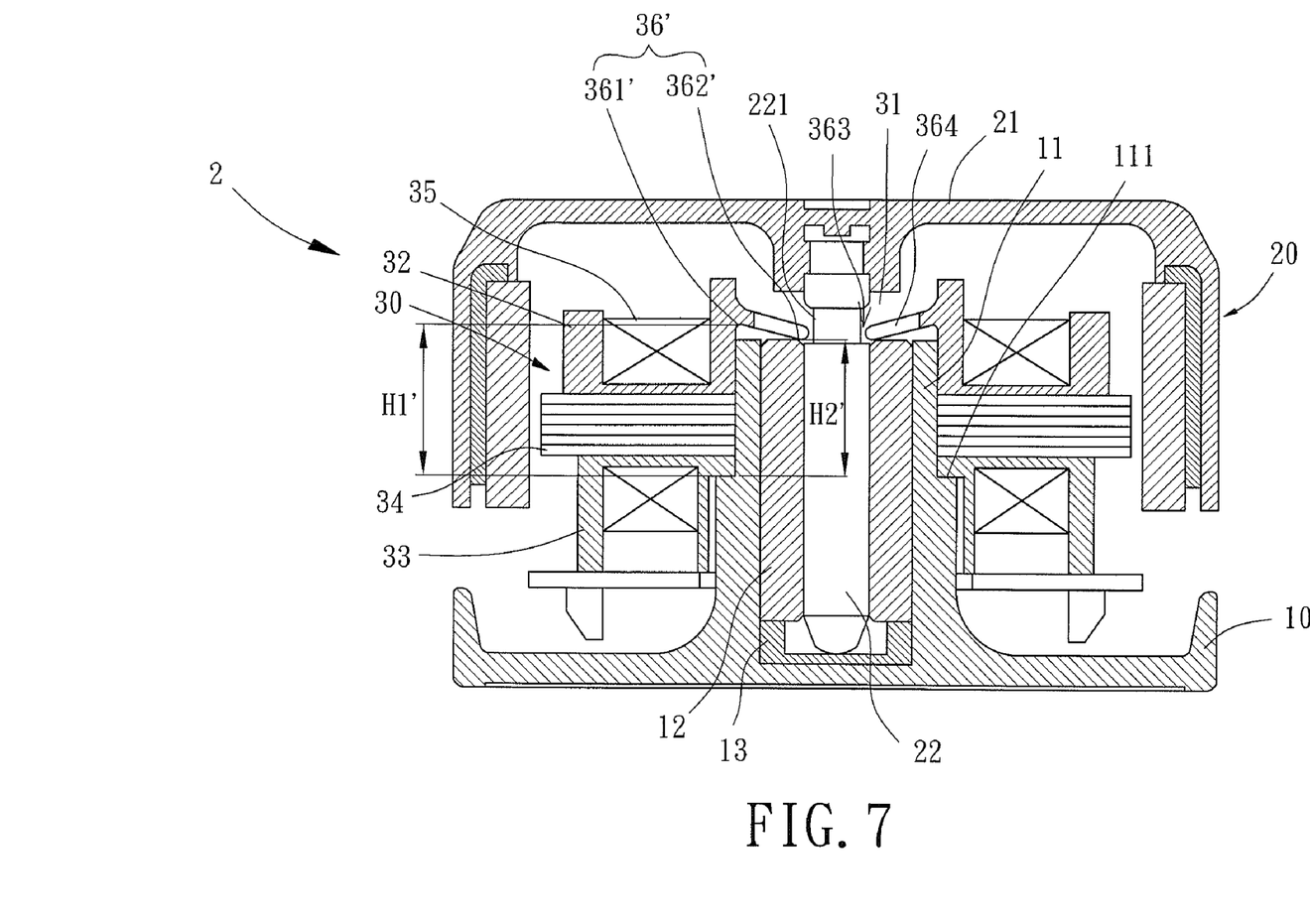
FIG. 7 is a cross sectional view illustrating the motor in accordance with the second embodiment of the present invention.
Figure 8:
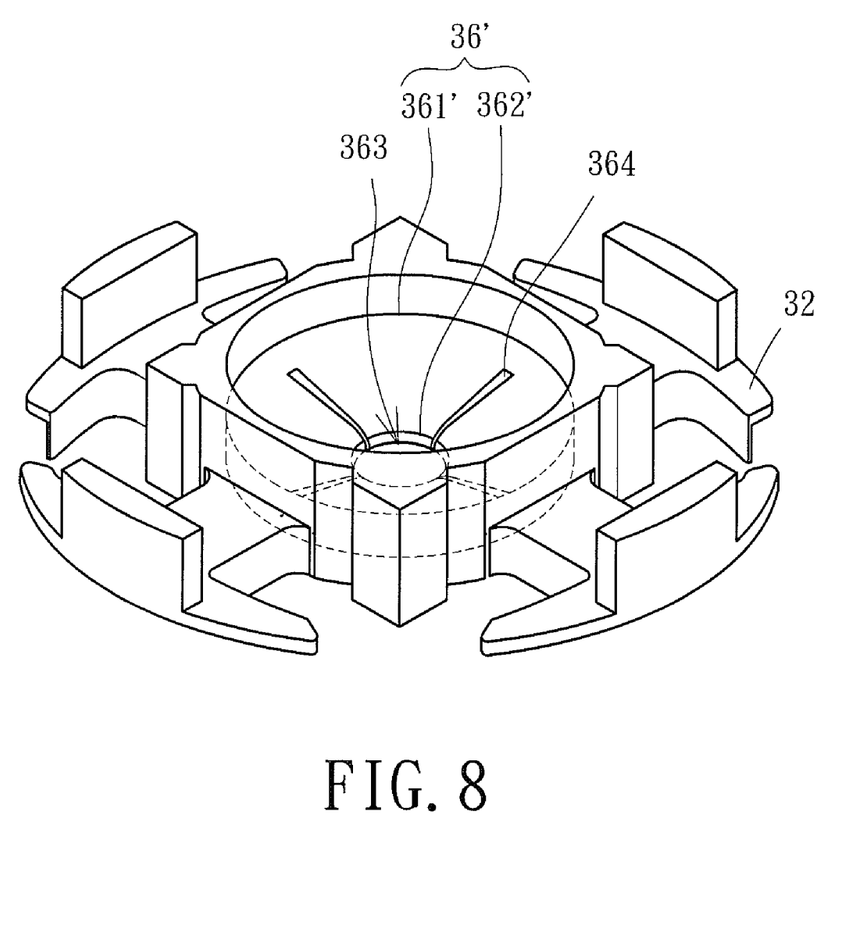
FIG. 8 is a partial, perspective view of an upper bobbin of the motor of FIG. 6.

In FIG. 3, the shaft tube 11 has the same height as the bearing 12. However, the shaft tube 11 may have a larger axial height than the bearing 12, as shown in FIG. 5 (the shaft tube 11 is higher than the bearing 12 by a distance D). Specifically, referring to FIG. 5, the shaft tube 11 has a free end 112 located between the first height H1 and the second height H2 in an axial direction of the motor, with the free end 112 not abutting and spaced from the first abutting portion 361. The modification in FIG. 5 shows that the first abutting portion 361 may still press the bearing 12 firmly even though the bearing 12 has a different height from the shaft tube 11. During operation of the motor, the space between the free end 112 of the shaft tube 11 and the first abutting portion 361 may provide a room for an up and down movement of the first abutting portion 361, which is caused by the bearing 12 suffering an axial vibration of the motor.

The supporting face of the positioning section 111 of the shaft tube 11 provides the stator 30 with an axial supporting force along a longitudinal axis of the shaft tube 11, with the stator 30 being mounted around the shaft tube 11 and on the positioning section 111. Thus, the stator 30 is in an appropriate assembling position neither too high nor too low relative to the bearing 12, and the abutting member 36 can therefore abut against the bearing 12 appropriately and extend into the annular groove 221 of the shaft 22. It assures that loosening of the bearing 12 or of the rotor 20 due to a higher assembling position of the stator 30, and breakage of the abutting member 36 due to a lower assembling position of the stator 30, are avoided. Therefore, the positioning section 111 of the shaft tube 11 positions the stator 30 to ensure the abutting member 36 works well and to improve convenience of assembling the motor.

FIGS. 6, 7, 8 and 9 show a motor 2 of a second embodiment according to the preferred teachings of the present invention modified from motor 1, wherein the abutting member 36' of the stator 30 is in the form of an annular pressing ring formed on the inner periphery of the upper bobbin 32. The abutting member 36' has a center hole 363 having a diameter smaller than an outer diameter of two sections of the shaft 22 and slightly larger than that of the neck of the shaft 22, with said two sections being adjacent to two end edges of the annular groove 221. The shaft 22 can thereby pass through the center hole 363 of the abutting member 36', with the abutting member 36' extending into the annular groove 221 of the shaft 22 to retain the shaft 22. Moreover, the abutting member 36' preferably forms a plurality of gaps 364 extending radially outwards from the inner edge of the abutting member 36', so that the shaft 22 can easily pass through the center hole 363 of the abutting member 36' in assembly. Therefore, the abutting member 36' not only abuts the bearing 12 to prevent the bearing 12 from disengaging from the shaft tube 11, but a positioning effect between an inner edge of the abutting member 36' and the annular groove 221 of the shaft 22 also effectively prevents the rotor 20 from disengaging from the shaft tube 11.

The abutting member 36' has a first end 361' connecting to an inner periphery of the upper bobbin 32, as well as a second end 362' abutting against a top surface of the bearing 12. The first end 361' has a first height H1' with respect to the supporting face of the positioning section 111, and the second end 362' has a second height H2' with respect to the supporting face of the positioning section 111. The first height H1' is greater than the second height H2'. The abutting member 36' extends in a straightforward manner from the first end 361' to the second end 362'. Besides, the abutting member 36' is spaced from the shaft tube 11 and abuts only on the bearing 12.

Figure 9:
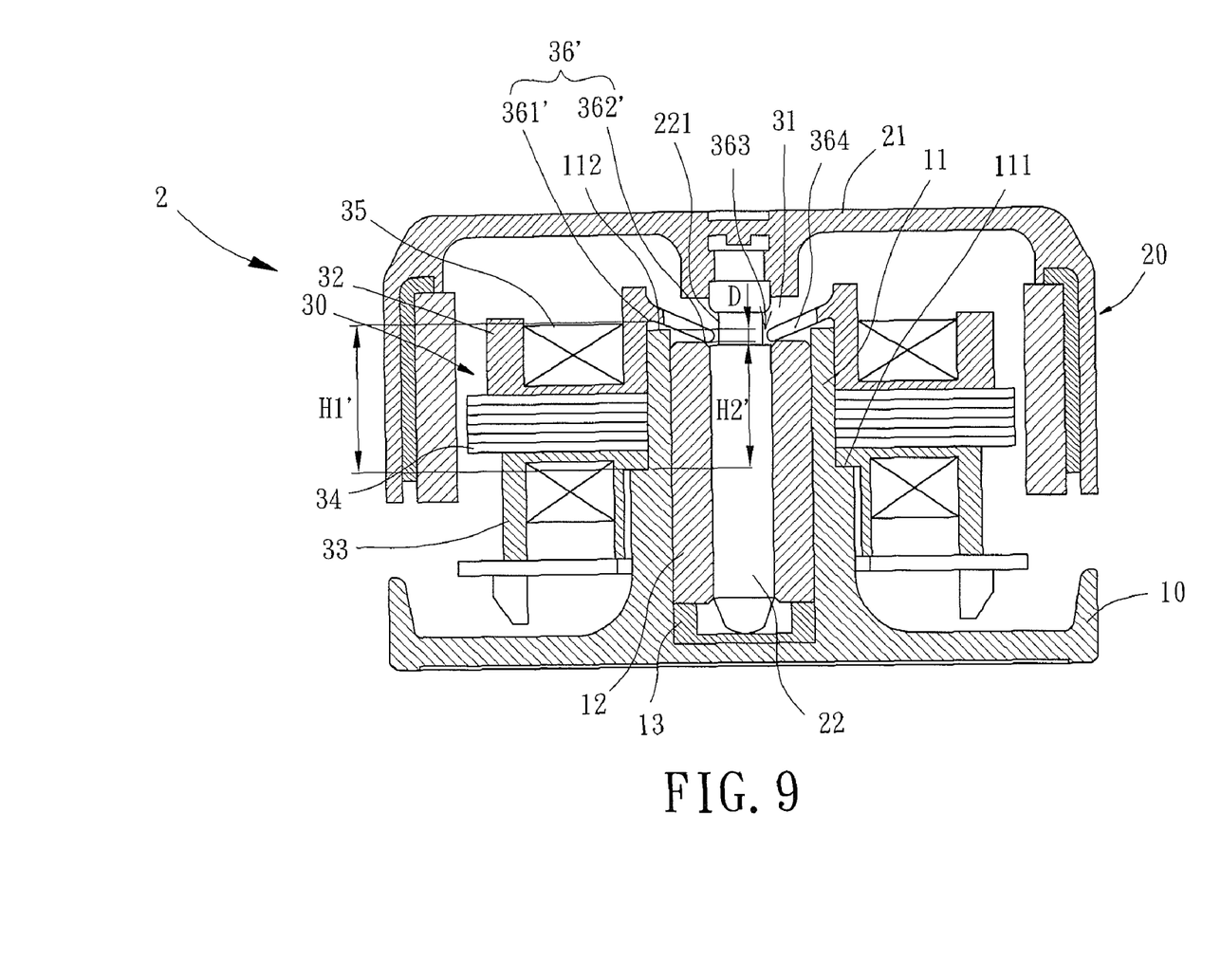
FIG. 9 is a cross sectional view illustrating a motor modified from the motor of the second embodiment of the present invention.
Figure 10:
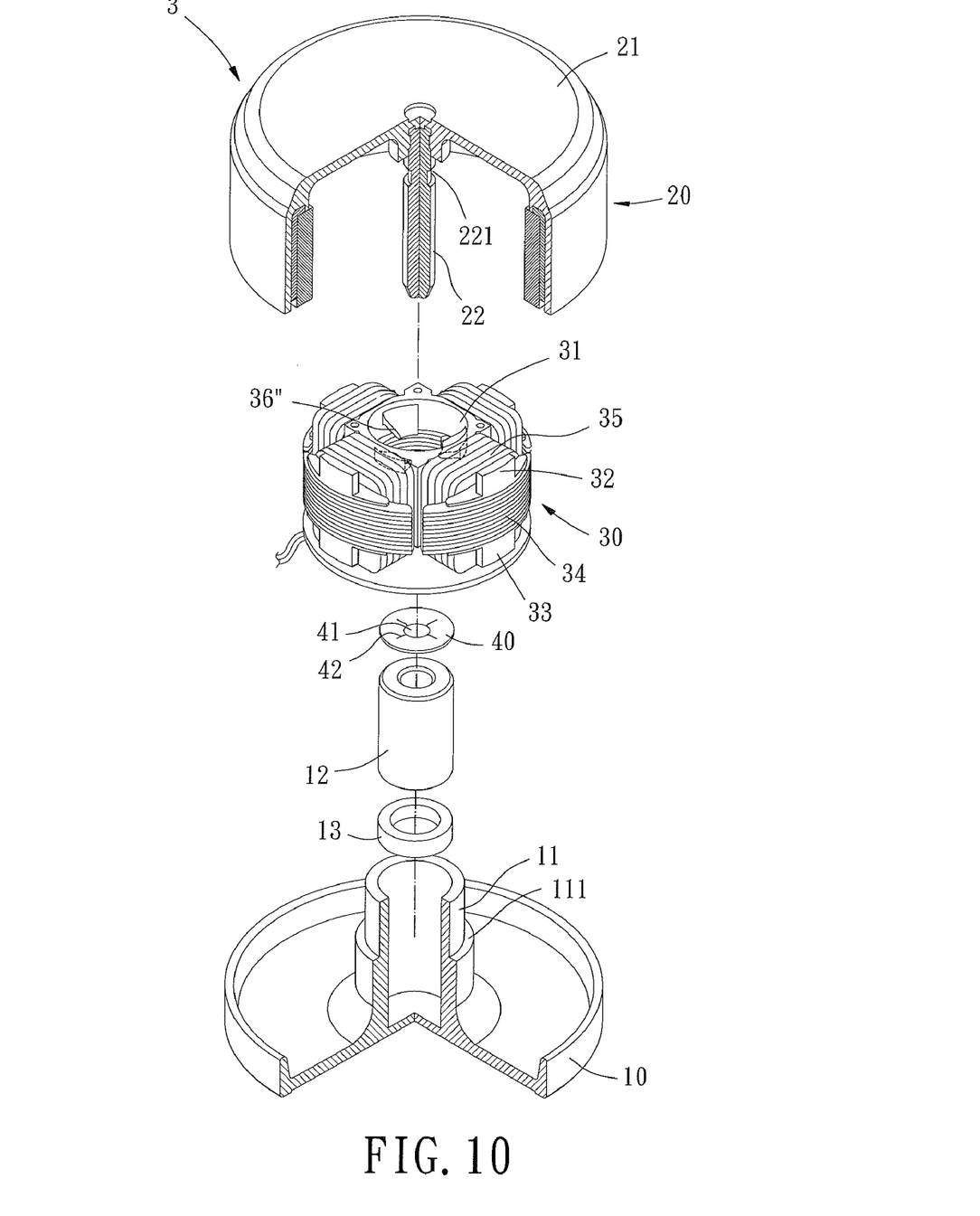
FIG. 10 is an exploded perspective view illustrating a motor in accordance with a third embodiment of the present invention.
Figure 11:
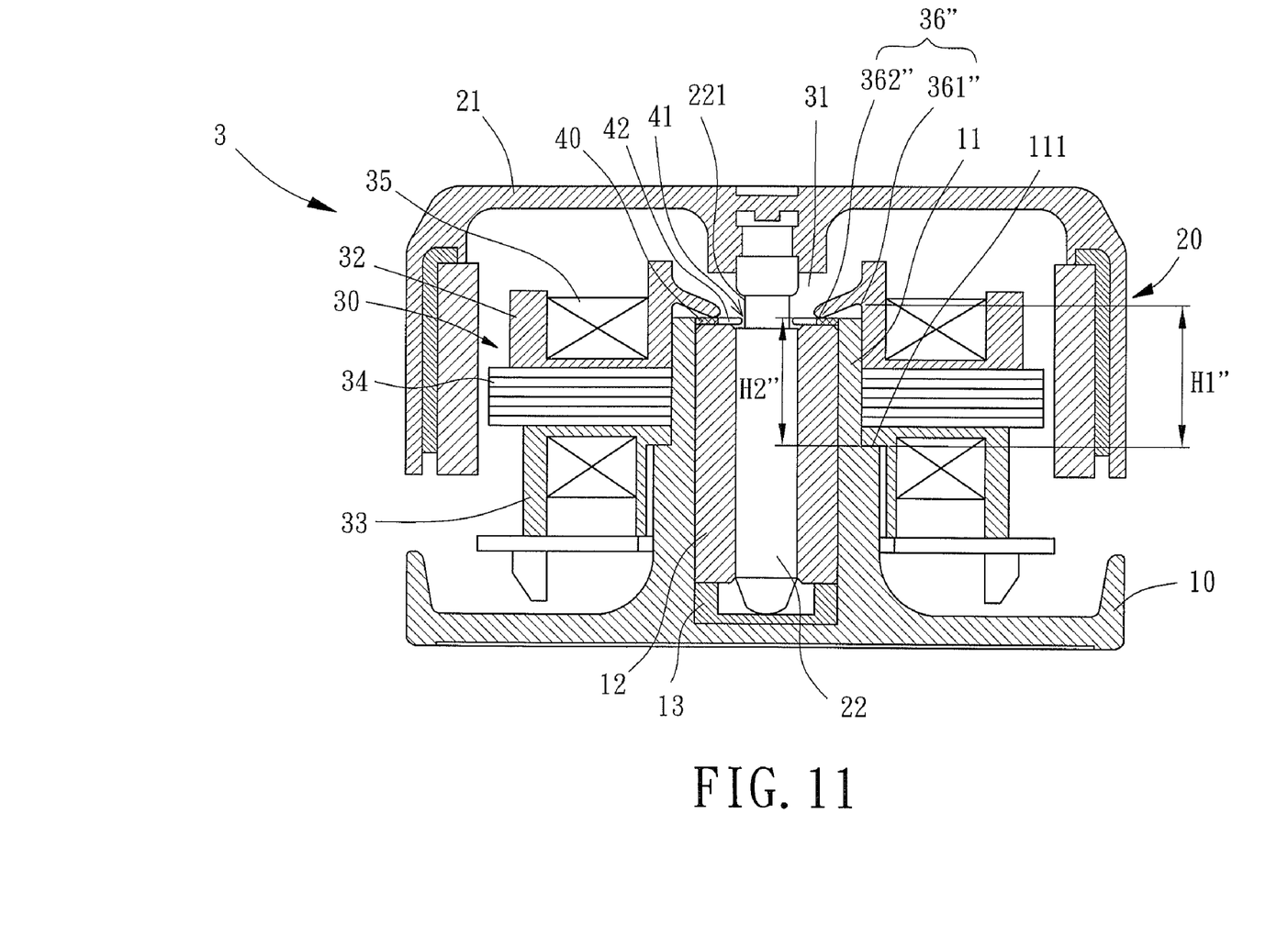
FIG. 11 is a cross sectional view illustrating the motor in accordance with the third embodiment of the present invention.
Figure 12:
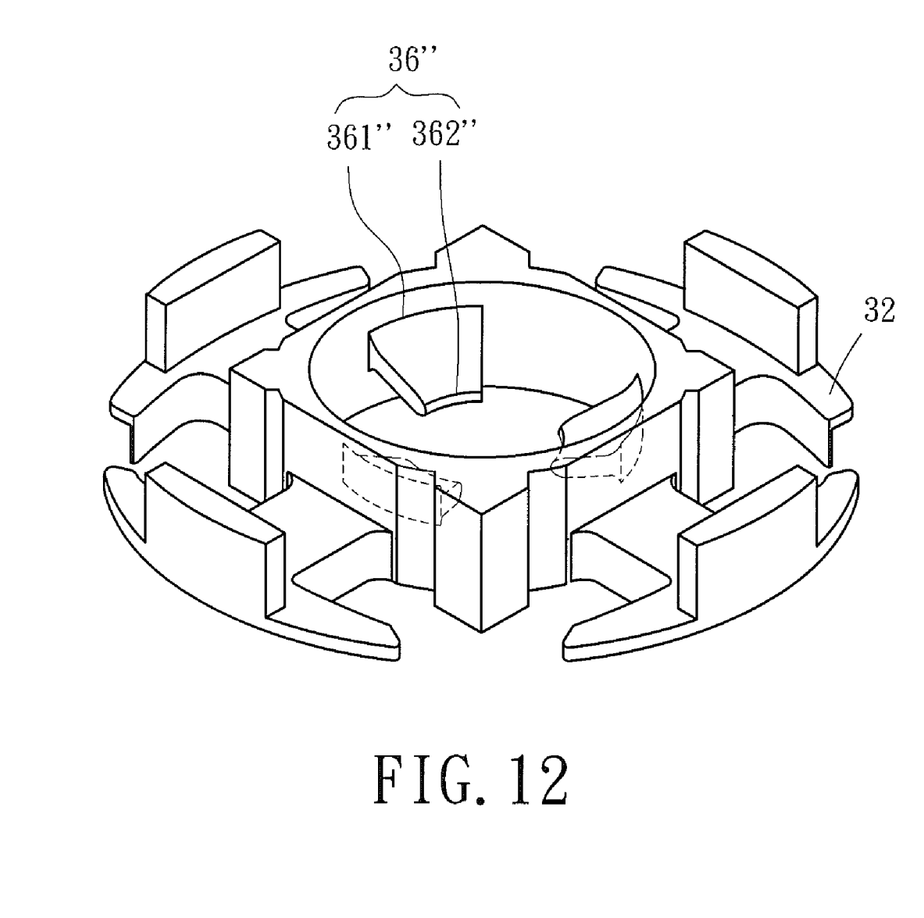
FIG. 12 is a partial, perspective view of an upper bobbin of the motor of FIG. 9.

The shaft tube 11 may have a larger axial height than the bearing 12, as shown in FIG. 9 (the shaft tube 11 is higher than the bearing 12 by a distance D). Similarly to FIG. 5, the free end 112 is located between the first height H1' and the second height H2' in an axial direction of the motor, with the free end 112 not abutting and spaced from the abutting member 36'.

FIGS. 10, 11, 12 and 13 show a motor 3 of a third embodiment according to the preferred teachings of the present invention modified from the motor 1, wherein the motor 3 further includes a cover plate 40 with an axial hole 41 for mounting around the shaft 22. The cover plate 40 covers the bearing 12, and an inner edge thereof is in the annular groove 221 of the shaft 22. Besides, a plurality of gaps 42 is formed on the cover plate 40 and extends radially outwardly from the inner edge thereof, so that the shaft 22 can easily pass through the axial hole 41 of the cover plate 40 in assembly. The abutting member 36" of the stator 30 is used to abut against the cover plate 40 to retain the bearing 12, and to prevent the rotor 20 from disengaging from the shaft tube 11. In the third embodiment, the abutting member 36" is in the form of a plurality of pressing blocks, and said pressing blocks are annularly formed, in intervals, on the inner periphery of the upper bobbin 32. Moreover, a free end of each pressing block abuts against a top surface of the cover plate 40 to retain the bearing 12 and the shaft 22. Hence, a more reliable positioning effect for the bearing 12 and the rotor 20 is provided.

The abutting member 36" has a first end 361" connecting to an inner periphery of the upper bobbin 32, as well as a second end 362" abutting against a top surface of the bearing 12. The first end 361" has a first height H1" with respect to the supporting face of the positioning section 111, and the second end 362" has a second height H2" with respect to the supporting face of the positioning section 111. The first height H1" is greater than the second height H2". The abutting member 36" extends in a straightforward manner from the first end 361" to the second end 362". Besides, the abutting member 36" is spaced from the shaft tube 11 and abuts only on the bearing 12.

Figure 13:
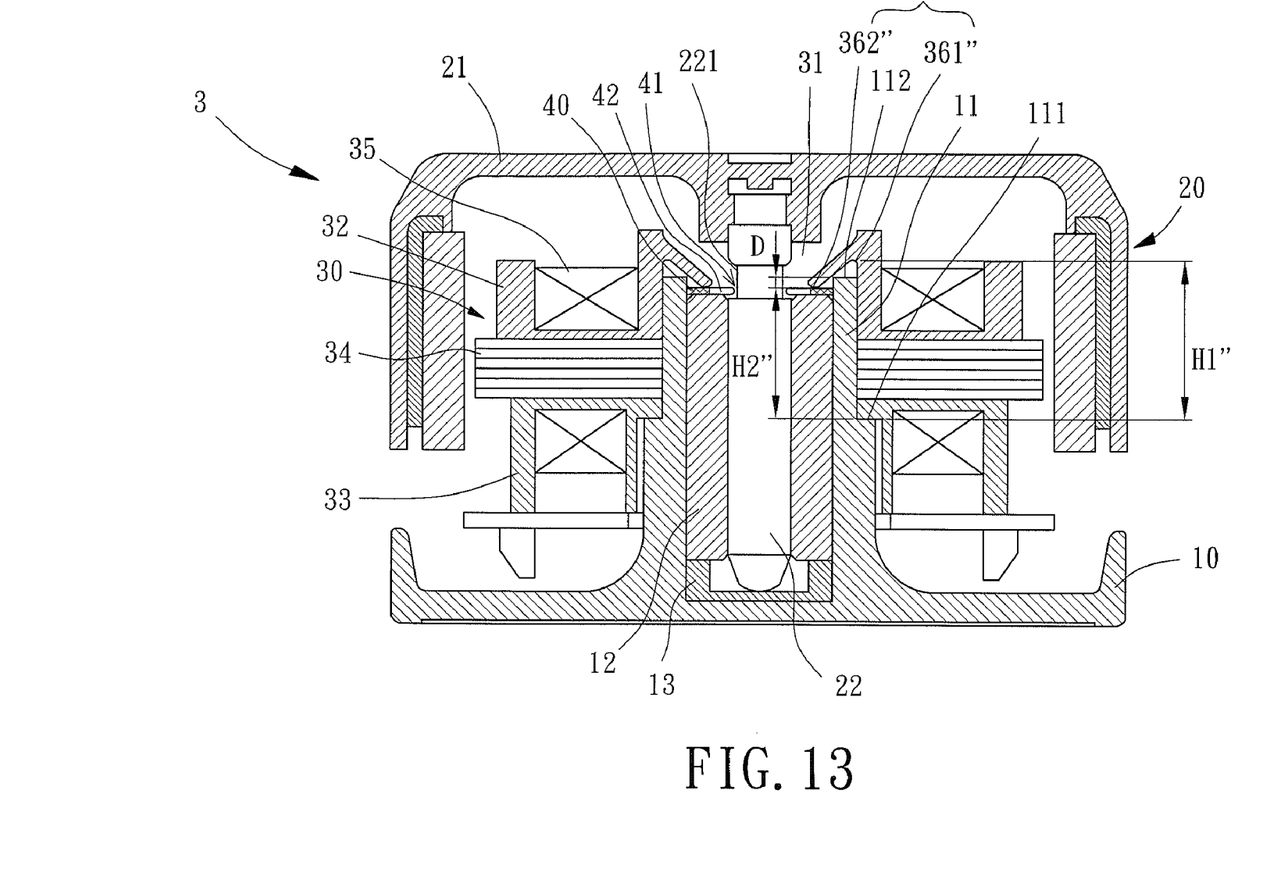
FIG. 13 is a cross sectional view illustrating a motor modified from the motor of the third embodiment of the present invention.

The shaft tube 11 may have a larger axial height than the bearing 12, as shown in FIG. 13 (the shaft tube 11 is higher than the second end 362", which abuts on the cover plate 40, by a distance D). Similarly to FIGS. 5 and 9, the free end 112 is located between the first height H1" and the second height H2" in an axial direction of the motor, with the free end 112 not abutting and spaced from the abutting member 36".

As has been discussed above, since the prevention of the departure of the rotor 20 from the shaft tube 11 can be achieved by different kinds of the abutting members 36, 36' and 36", a part of the shaft 22 with a predetermined length near the bottom of the shaft 22 for receiving a retaining plate is not necessary. Therefore, without a need for the predetermined length, the motor of the present invention can enhance the contact area between the bearing 12 and the shaft 22 to effectively improve rotating stability of the rotor 20. Moreover, in assembling the motor of the present invention without a retaining plate, after the bearing 12 and other components are put into the shaft tube 11, after the stator 30 is mounted around the shaft tube 11, and after the shaft 22 of the rotor 20 is coupled with the bearing 12, the abutting members 36, 36' and 36" are used to prevent the rotor 20 from disengaging from the bearing 12. Consequently, combination of the stator 30 and the shaft tube 11 or combination of the stator 30, the bearing 12, the rotor 20 and other components can be checked outside the shaft tube 11. Thus, assembling quality and convenience of the motor of the present invention are easily controlled and improved, respectively.

Besides, by using the abutting members 36, 36' and 36", not only is the departure of the rotor 20 from the shaft tube 11 prevented, but also the holding of the bearing 12 is provided. Thus, prevention of departure of the bearing 12 and of the rotor 20 from the shaft tube 11 is achieved at the same time. The positioning section 111 of the shaft tube 11 provides the stator 30 with the axial supporting force along the longitudinal axis of the shaft tube 11 to make the abutting members 36, 36' and 36" abut the bearing 12 appropriately, so that loosening of the bearing 12 and of the rotor 20 due to higher assembling position of stator 30, and breakage of the abutting member 36 due to lower assembling position of stator 30, are avoided. Thus, assembling convenience is provided.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A motor, comprising:
   a housing including a shaft tube receiving a bearing, wherein the shaft tube has a free end;
   a rotor including a shaft rotatably extending through the bearing and having an annular groove in a neck shape formed on an outer periphery thereof; and
   a stator including an assembling hole receiving the outer periphery of the shaft tube, with the stator including an upper bobbin, a lower bobbin, a plurality of silicon steel plates sandwiched between the upper and lower bobbins, and a winding wound around the plurality of silicon steel plates, wherein the upper bobbin includes an abutting member in the form of a plurality of pressing plates, wherein said pressing plates are annularly formed on an inner periphery of the upper bobbin with intervals, with each pressing plate having a first abutting portion and a second abutting portion, with the first abutting portion having a first end connecting to the inner periphery of the upper bobbin and a second end abutting against a top surface of the bearing, with the first abutting portion extending in a straightforward manner from the first end to the second end, with the free end of the shaft tube being lower than the first end but higher than the second end of the first abutting portion in an axial direction, with the first abutting portion being spaced from the shaft tube and abutting only on the bearing, with the second abutting portion extending from the first abutting portion into the annular groove of the shaft to avoid the bearing and the rotor from disengaging from the shaft tube.

2. The motor as defined in claim 1, wherein the shaft tube includes a positioning section on the outer periphery thereof, with the positioning section having a supporting face providing the stator with an axial supporting force along a longitudinal axis of the shaft tube.

3. A motor, comprising:
   a housing including a shaft tube receiving a bearing, wherein the shaft tube has a free end;
   a rotor including a shaft rotatably extending through the bearing and having an annular groove in a neck shape formed on an outer periphery thereof; and
   a stator including an assembling hole receiving the outer periphery of the shaft tube, with the stator including an upper bobbin, a lower bobbin, a plurality of silicon steel plates sandwiched between the upper and lower bobbins, and a winding wound around the plurality of silicon steel plates, with the upper bobbin including an abutting member in the form of an annular pressing ring formed on an inner periphery of the upper bobbin and having a center hole receiving the shaft, with the annular pressing ring having a first end connecting to the inner periphery of the upper bobbin and a second end abutting against a top surface of the bearing, with the annular pressing ring extending in a straightforward manner from the first end to the second end, with the free end of the shaft tube being lower than the first end but higher than the second end of the first abutting portion in an axial direction, with the annular pressing ring being spaced from the shaft tube, with the annular pressing ring abutting only against the bearing and extending into the annular groove of the shaft to avoid the bearing and the rotor from disengaging from the shaft tube.

4. The motor as defined in claim 3, wherein a diameter of the center hole is smaller than an outer diameter of two sections of the shaft and slightly larger than that of the neck of the shaft, with said two sections being adjacent to two end edges of the annular groove.

5. The motor as defined in claim 4, wherein the annular pressing ring forms a plurality of gaps extending radially and outwards from an inner edge of the annular pressing ring.

6. The motor as defined in claim 3, wherein the shaft tube includes a positioning section on the outer periphery thereof, with the positioning section having a supporting face providing the stator with an axial supporting force along a longitudinal axis of the shaft tube.

7. A motor, comprising:
   a housing including a shaft tube receiving a bearing, wherein the shaft tube has a free end;
   a rotor including a shaft rotatably extending through the bearing and having an annular groove on an outer periphery thereof;
   a cover plate including an axial hole receiving the shaft, with an inner edge of the cover plate extending into the annular groove of the shaft; and
   a stator including an assembling hole receiving the outer periphery of the shaft tube, with the stator including an upper bobbin, a lower bobbin, a plurality of silicon steel plates sandwiched between the upper and lower bobbins, and a winding wound around the plurality of silicon steel plates, with the upper bobbin including an abutting member formed on an inner periphery thereof, with the abutting member having a first end connecting to the inner periphery of the upper bobbin and a second end abutting against the cover plate, with the abutting member extending in a straightforward manner from the first end to the second end and being spaced from the shaft tube, with the free end of the shaft tube being lower than the first end but higher than the second end of the first abutting portion in an axial direction, with the abutting member abutting only against the cover plate to avoid the bearing and the rotor from disengaging from the shaft tube.

8. The motor as defined in claim 7, wherein the abutting member is in the form of a plurality of pressing blocks, and the pressing blocks are annularly formed, in intervals, on the inner periphery of the upper bobbin, with a free end of each pressing block abutting against a top surface of the cover plate.

9. The motor as defined in claim 7, wherein the cover plate forms a plurality of gaps extending radially and outwards from the inner edge of the cover plate.

10. The motor as defined in claim 7, wherein the shaft tube includes a positioning section on the outer periphery thereof, with the positioning section having a supporting face providing the stator with an axial supporting force along a longitudinal axis of the shaft tube.

* * * * *